United States Patent
Bradley

(10) Patent No.: US 6,758,234 B2
(45) Date of Patent: Jul. 6, 2004

(54) PRESSURE REDUCING VALVE

(76) Inventor: Peter Michael Bradley, 407 Old Taupo Road, Rotorua (NZ)

( * ) Notice: Subject to any disclaimer, the term of this patent is extended or adjusted under 35 U.S.C. 154(b) by 0 days.

(21) Appl. No.: 09/965,380

(22) Filed: Sep. 28, 2001

(65) Prior Publication Data

US 2002/0096215 A1 Jul. 25, 2002

Related U.S. Application Data

(63) Continuation of application No. PCT/NZ00/00040, filed on Mar. 31, 2000.

(30) Foreign Application Priority Data

Mar. 31, 1999 (NZ) .................................................. 334938

(51) Int. Cl.⁷ .............................................. G05D 16/06
(52) U.S. Cl. ............. 137/102; 137/115.14; 137/115.15; 137/116.3
(58) Field of Search ....................... 137/115.14, 115.15, 137/102, 116.3, 107

(56) References Cited

U.S. PATENT DOCUMENTS 2,662,543 A * 12/1953 Stacey ................... 137/115.13
4,109,714 A * 8/1978 Greenlee et al. ............ 137/487
4,917,140 A * 4/1990 King et al. ............... 137/116.3
5,213,135 A * 5/1993 Moate .......................... 251/58

\* cited by examiner

Primary Examiner—Stephen M. Hepperle
(74) Attorney, Agent, or Firm—Lowe Hauptman Gillman & Berner LLP

(57) ABSTRACT

A combined fluid pressure reducing and relief valve having aligned inlet and outlet connections, a pair of abutting rotary disc valve sets each having an inboard stationary and an outboard rotary ceramic disc which are relatively rotatable against each other to expose and close openings therein. The sets are regulated by a pressure sensitive member comprising a diaphragm flush with a piston which is movable against a spring in response to low pressure fluid in the valve whereby one set opens until that pressure reaches a "set" pressure. If the low pressure increases to a "initial relief pressure," further movement of the pressure sensitive member results. Finally with still further movement the low pressure side reaches a "relief pressure" whereby the other rotary valve set opens while the first is closed and remains open until the low pressure side is reduced to below the "set" pressure.

14 Claims, 12 Drawing Sheets

PRESSURE REDUCING VALVE

RELATED APPLICATION

This Application is a continuation of International Patent Application No. PCT/NZ00/00040, filed Mar. 31, 2000, International Publication No. WO 00/58653, published Oct. 5, 2000.

FIELD OF THE INVENTION

This invention relates to improvements in and relating to valves and valve systems for use in controlling the flow of fluids.

BACKGROUND OF THE INVENTION

In particular the present invention relates to improvements relating to valves and valve systems wherein a valve is used to control the flow of fluid between high pressure and low pressure fluid systems.

In general, the fluid may be a liquid. However, this should not be seen as limiting as the present invention may also be utilized to regulate the flow of other fluids such as gases for example.

Valves which regulate the flow of fluid between high pressure and low pressure fluid systems are known. However, they all suffer from a number of disadvantages.

One type of valve used to regulate the pressure between a high pressure and low pressure fluid system is the pressure reducing or pressure equalizing valve, such as the AJAX® valve. This type of valve is commonly used to regulate the flow of high pressure ("HP") mains water (generally in the order of 20–100 PSI) as it enters a low pressure ("LP") hot water storage cylinder (generally having a maximum internal pressure threshold of approximately 10 PSI).

In FIG. 1 there is shown a typical prior art standard pressure reducing valve generally indicated by arrow 1. The valve has a valve body 2, an HP inlet 3 connected to a mains water supply and a LP outlet 4 connected to a low pressure hot water storage cylinder. The valve also has a rubber diaphragm 5 which is attached via a bracket 6 to a rubber washer 7. Diaphragm 5 is also attached to a spring 8 which is capable of having its tension adjusted.

The rubber diaphragm 5 is sensitive to pressure changes within the hot water cylinder ("LP fluid system") and either moves in the direction of arrow A when there is an increase in pressure in the LP fluid system, or moves in the direction of arrow B when there is a decrease in pressure in the LP fluid system.

The sensitivity of the rubber diaphragm 5 to pressure changes within the LP fluid system can be adjusted by altering the tension of spring 8.

When valve 1 is in use, as pressure builds in the LP fluid system this causes washer 7 to also move in direction A and to contact a valve seat 9 to shut off the water supply from inlet 3. Conversely, if the pressure within the LP fluid system is reduced the diaphragm and washer move in the direction of arrow B which allows water to enter the LP fluid system.

However, this type of valve suffers from a number of drawbacks.

One drawback with such valves, is that the seal between washer 7 and valve seat 9 is prone to being compromised due to small particles either damaging or obstructing the sealing face. Thus, this drawback can lead to a constant flow of water into the LP fluid system.

A further disadvantage with such valves is that poor construction of the valve can lead to washer 7 not being in proper alignment with seat 9, thereby allowing HP water effectively to bypass the valve and enter the LP fluid system in an uncontrolled manner.

A further drawback with this type of valve is that if the sensitivity of rubber diaphragm 5 is not adjusted properly HP water can again effectively bypass the valve and enter the LP system.

A further disadvantage with such valves is that if there is an increase in pressure in the mains water supply, this increase may be sufficient to overcome the force being applied to the washer via the diaphragm so that HP water can enter the LP fluid system in an uncontrolled manner.

In addition to the above drawbacks, the use of standard pressure reducing or equalizing valves, such as described in relation to FIG. 1, in commercial or household hot water systems can also create a number of other problems.

The aforementioned type of valve due to its construction requires a hot water cylinder be fitted with a vent pipe. The presence of a vent pipe creates a number of problems which include:

The expense involved in creating a hole through the roof and flashing for the vent pipe;

One pipe circulation in the vent pipe caused by thermo-syphoning resulting in continual power wastage as the hot water that cools in the vent pipe needs to be reheated in the hot water cylinder; and Burst hot water cylinders caused by frozen vent pipes leading to flooded premises and expensive repairs, as well as to increase the risk of electrocution.

A further disadvantage that occurs with this type of valve is that the diameter of the inlet orifice of the high pressure system must be reduced to allow the pressure of the LP fluid system, as amplified by the diaphragm, to equalize the pressure of the fluid at the HP inlet. As a result, the water pressure from this type of hot water system has a poor flow pressure at most outlets.

Another type of pressure reducing valve which suffers from the same drawbacks as described above is disclosed in NZ 153402/154210. The valve disclosed in this specification uses a flexible sleeve sensitive to pressure changes in a LP fluid system, to cause a valve head to move into or out of contact with a valve seat, located at the end of a high pressure fluid inlet.

It is an object of the present invention to address the foregoing problems or at least to provide the public with a useful choice.

Further aspects and advantages of the present invention will become apparent from the ensuing description which is given by way of example only.

SUMMARY OF THE INVENTION

According to one aspect of the present invention there is provided a valve assembly which includes:

At least one valve port;

At least one fluid inlet; and

An outlet for connection to a fluid system;

characterized in that the valve assembly includes a pressure sensitive member which is connected to the outlet, so that the size of the pressure sensitive member is capable of increasing or decreasing in response to pressure changes within the fluid system, wherein the valve is configured so that said increases or decreases to the size of the pressure sensitive member cause the inlet and valve port to move either into or out of alignment with one another.

According to another aspect of the present invention there is provided a valve assembly substantially as described above wherein the valve assembly includes a relief outlet.

According to another aspect of the present invention there is provided a valve assembly substantially as described above wherein the valve assembly includes a relief outlet, characterized in that the valve assembly is configured so that the pressure sensitive member will increase in size to an extent that enables the member to move the relief outlet and valve port into alignment with one another, if a predetermined pressure threshold limit is reached.

According to a further aspect of the present invention there is provided a valve assembly wherein the valve assembly ("Mod Assembly") includes:

a) At least one valve port;
b) A first opening;
c) Second opening or openings;
d) Third opening or openings; and
e) A pressure sensitive member;

characterized in that the valve assembly is configured so that the position of the pressure sensitive member is capable of being altered solely in response to pressure changes within a fluid system to which the first opening is connected, wherein said changes in the position of the pressure sensitive member cause the valve port to move either into or out of alignment with the second or third opening, so that the valve port is moveable to each of the following positions:

a) At least partially aligned with the second opening or openings but not the third opening or openings; or
b) At least partially aligned with the third opening or openings but not the second opening or openings; or
c) Non-aligned with either the second or third openings.

According to another aspect of the present invention there is provided a method of operating a valve assembly connected to a high pressure inlet of a relatively low pressure fluid system so as to regulate inlet flow into the system, the method characterized by the step of:

a) Utilizing a pressure sensitive member to move at least one valve port and fluid inlet either, into, or out of, alignment with one another, when the pressure within the fluid system increases or decreases.

According to another aspect of the present invention there is provided a method, substantially as described above, characterized by the additional step of:

b) Utilizing the pressure sensitive member to move the valve port or ports and at least one relief outlet into alignment with one another, if a predetermined pressure threshold limit is reached.

According to a further aspect of the present invention there is provided a method of operating a valve assembly connected via a first opening to a fluid system, to regulate over-pressure and under-pressure situations within the system, via a pressure sensitive member, the method characterized by the steps of:

a) Moving the valve port or ports and second opening or openings into at least partial alignment with one another; or
b) Moving the valve port or ports and third opening or openings into at least partial alignment; or
c) Moving valve port or ports so as to be non-aligned with either the second or third openings.

The present invention relates to improvements relating to valves and valve systems wherein a valve is generally used either to control the flow of fluid between relatively high and low pressure fluid systems or regulate the pressure within a fluid system or to do both.

In general, the fluid may be a liquid. However, this should not be seen as limiting inasmuch as the present invention may also be utilized to regulate the flow of other fluids such as gases for example.

The valve port or ports may be either the same or a different orifice or orifices within the valve assembly capable of allowing fluid either to enter or to exit the valve assembly, or to do both.

The inlet of the valve assembly in some embodiments may itself be connected to the terminal end of a conduit transporting fluid from a high pressure ("HP") fluid supply.

However, in preferred embodiments the inlet of the valve assembly may be an orifice within the valve assembly which is not situated directly at the point where the valve connects to the conduit transporting the fluid from an HP fluid supply.

The outlet in preferred embodiments maybe an opening in the valve assembly which allows fluid to exit the valve assembly and enter a low pressure ("LP") fluid system. However, as the pressure in the LP fluid system rises fluid is able to enter the valve assembly from the LP fluid system via this opening.

In general, the outlet may be connected to a conduit leading to the LP fluid system. However, this should not necessarily be seen as limiting the scope of the present invention.

It is envisaged that the pressure sensitive member may come in a variety of different forms and be made of a variety of different materials.

In general, the shape, configuration or materials or any combination thereof from which the pressure sensitive member is made should enable the size of the pressure sensitive member either to increase or decrease in response to pressure changes.

The pressure sensitive member may be composed of a substantially resilient material.

In preferred embodiments the pressure sensitive member may be composed of rubber or other compounds having similar characteristics.

In some embodiments of the present invention the pressure sensitive member may in its configuration resemble a balloon or flexible corrugated bellows.

In some other embodiments the pressure sensitive member may be in the form of a substantially elongate hollow cylinder or other similar shape.

In preferred embodiments the pressure sensitive member may be in the form of a diaphragm.

However, it should be appreciated by those skilled in the art that the pressure sensitive member may also have other configurations or be composed of other materials, or both, without departing from the scope of the present invention.

In some embodiments, the size of the pressure sensitive member which alters, upon an increase or decrease in pressure, is the length of the pressure sensitive member.

In such embodiments to help ensure that a change in pressure results in the length of the pressure sensitive member being altered, the pressure sensitive member may be housed within a rigid casing, to minimize any lateral expansion of the member.

In preferred embodiments the surface area of the pressure sensitive member may increase or decrease in response to pressure changes in the LP system.

It is envisaged that the pressure sensitive member may be connected to the outlet in a variety of different ways, without limiting the scope of the present invention.

In preferred embodiments the PSM may be located in a valve chamber to which the outlet is connected.

In some embodiments where it is the length of the pressure sensitive member that is altered, the pressure sensitive member may be attached to a lower valve body, said lower valve body including the outlet.

The valve port may have a variety of different configurations without departing from the scope of the present invention.

In general, the valve port may be located in a valve head.

In preferred embodiments the valve head may have at least its sealing face composed of a ceramic or similar material, and the outer face of the fluid inlet which abuts the sealing face of the valve head may also be composed of ceramic or similar material.

In preferred embodiments the valve head may be in the form of a disc composed of a ceramic or similar material. In such embodiments the fluid inlet or inlets may be also located in a ceramic disc.

In most embodiments where it is the length of the pressure sensitive member which is altered, the perimeter of the sealing face of the valve head, may be enclosed by a portion of the valve body composed of ceramic material.

This portion of the valve body substantially corresponds to the shape and dimensions of the perimeter of the valve head. Thereby the valve head is enabled to move relative to the surrounding ceramic material in a fluid-tight manner. In such embodiments the valve head may generally be in the form of a stem.

It should be appreciated by those skilled in the art, that the valve head and outer face of the inlet may be composed of other materials provided they allow the valve head and outer face of the fluid inlet to move with respect to one another in a fluid-tight manner.

In preferred embodiments, the valve port or ports move substantially laterally with respect to the inlet and the direction of fluid flow through the inlet of the valve assembly.

The inventor has found the advantage provided by lateral movement of the port is that it enables a positive on or off disposition to be achieved when the port is moved into or out of alignment with the fluid inlet.

In all preferred embodiments, the size of the pressure sensitive member alters as a result of pressure changes that occur within the LP fluid system to which the outlet of the valve assembly is connected.

In general, the size of the pressure sensitive member will decrease when the pressure in the LP fluid system drops, and conversely will increase when the pressure within the LP system rises.

In preferred embodiments the construction of the valve assembly is such that the valve port and inlet may be moved into alignment with one another, by the pressure sensitive member, when the pressure in the LP fluid system falls below a predetermined pressure. Conversely, the valve port and inlet will be moved out of alignment, by the pressure sensitive member, when the pressure in the LP fluid system rises above a predetermined pressure.

It is envisaged that the sensitivity of the pressure sensitive member will be governed by the maximum pressure of the LP fluid system the valve assembly will be regulating.

Once the valve port and inlet are no longer in alignment should the pressure in the LP fluid system continue to rise above a predetermined maximum pressure threshold, excess fluid may be released from the valve assembly to relieve the pressure build-up in the LP fluid system.

It is envisaged that the relief of pressure from within the LP fluid system may occur in a variety of different ways.

In some embodiments, the valve assembly may include a spring loaded relief valve which opens when the pressure within the valve assembly reaches a maximum predetermined pressure threshold, thereby to relieve pressure in the LP fluid system.

In preferred embodiments, the continual build up of pressure to the maximum pressure threshold in the LP fluid system, causes the size of the pressure sensitive member to increase further, so that the valve port or ports can be brought into alignment with a relief outlet. By this means fluid may exit the valve assembly to help relieve pressure within the LP fluid system.

It is envisaged there may be a variety of different ways in which changes to the size of the pressure sensitive member may cause the valve port or ports and inlet or inlets to move into and out of alignment with one another.

In some embodiments, the increasing or decreasing length of the pressure sensitive member may cause it or another part of the valve assembly to contact at least one switch which activates at least one solenoid which then moves the valve port or ports either into or out of alignment with the fluid inlet or inlets.

In other embodiments, the pressure sensitive member may be attached to an upper valve body which includes the fluid inlet or inlets. The pressure sensitive member also being connected to a lower valve body which includes the fluid outlet. The valve port being arranged so that it does not move relative to the lower body. Consequently, increases and decreases in the length of the pressure sensitive member cause the fluid inlet to move either into or out of alignment with the valve port.

In such embodiments, the pressure sensitive member may be attached to the upper valve body in variety of different ways without limiting the scope of the present invention.

In preferred embodiments, increasing or decreasing the surface area of the pressure sensitive member may act to cause rotation of a valve head in the form of a disc including at least one valve port such that the port moves either into or out of alignment with the fluid inlet.

It should be appreciated that as an alternative to the above configurations, the pressure sensitive member may be configured so that it is able to contact the valve head to bring the valve port into or out of alignment with the fluid inlet.

Movement of the pressure sensitive member may also in some preferred embodiments move valve port or ports into and out of alignment with the pressure relief outlet.

In general it is envisaged that the present invention will be utilized in either domestic or commercial hot water systems to regulate the flow of HP mains water into an LP hot water cylinder. However, this should not be seen as limiting.

In relation to the Mod Assembly:
a) The first opening is functionally equivalent to the outlet of the valve assembly;
b) The second opening is generally functionally equivalent to the fluid inlet of the valve assembly described above; and
c) The third opening is generally functionally equivalent to the relief port of the valve assembly described above.

However, in some situations of the present invention in particular the Mod Assembly may be utilized solely as a pressure relief valve, and will not regulate the flow of HP mains water into an LP fluid system.

For ease of reference only, the use of the present invention as a pressure relief valve will now be described in relation to the Mod Assembly.

When the Mod Assembly of the present invention is being used solely as a pressure relief valve it will not be connected to the HP inlet of an LP fluid system. By way of contrast, the first opening of the valve assembly will instead be connected to the LP fluid system.

The second opening or openings will be connected to an exhaust conduit and the third opening or openings will be connected to the outside environment. The purpose of the second opening or openings to allow for fluid to exit the LP fluid system when the valve port is aligned with the second opening or openings so as to relieve an over-pressure situation in the LP fluid system. Conversely, the purpose of the third valve opening or openings is to allow for the entry of air into the LP fluid system when the port and third opening or openings are aligned, so as to relieve a negative pressure situation in the LP fluid system.

To function as a relief valve the Mod valve assembly needs to be reconfigured so that:

a) The valve port is not aligned with the second or third opening or openings, when the fluid system is in a "neutral" situation (i.e. not in an over- or under-pressure situation);

b) The valve port is aligned with the second opening or openings but not the third opening or openings when the fluid system is in an over-pressure situation; and c) The valve port is aligned with the third opening or openings but not the second opening or openings when the fluid system is in an under-pressure situation.

It should be appreciated by those skilled in the art, that when the present invention is attached to an LP system so as to act solely as a relief valve; the regulation of the HP fluid flow into the LP system may be undertaken by any suitably configured valve assembly.

Thus, preferred embodiments of the present invention may have a number of advantages over the prior art.

One advantage of the present invention is that the valve provides a positive on or off disposition for regulating fluid flow into an LP fluid system. Furthermore, due to its construction the valve assembly of the present invention is not prone to being compromised due to small particles in the fluid.

A further advantage of the present invention is that any increase in the pressure of the inlet fluid flow will not cause the valve effectively to be bypassed.

A further advantage of certain embodiments of the present invention is that they contain, or can act as, a pressure relief valve capable of relieving pressure in the LP fluid system due to thermal expansion, or to cover the situation where the valve should fail for any reason.

Further advantages of the present invention when used in either a domestic or commercial hot water system may include one or both of the following:

(i) There is no requirement for the hot water cylinder to be fitted with a vent pipe, so that none of the related problems associated with vent pipes occur; and (ii) A full flow hot water can be supplied inasmuch as there is no requirement to reduce the diameter of the inlet orifice.

Another advantage of the present invention is that the valve assembly may also be connected to an LP fluid system so as to act solely as a pressure relief valve.

BRIEF DESCRIPTION OF THE DRAWINGS

Further aspects of the present invention will become apparent from the following description which is provided by way of example only and with reference to the accompanying drawings in which.

DETAILED DESCRIPTION OF THE PREFERRED EMBODIMENTS OF THE INVENTION

Figure 1:
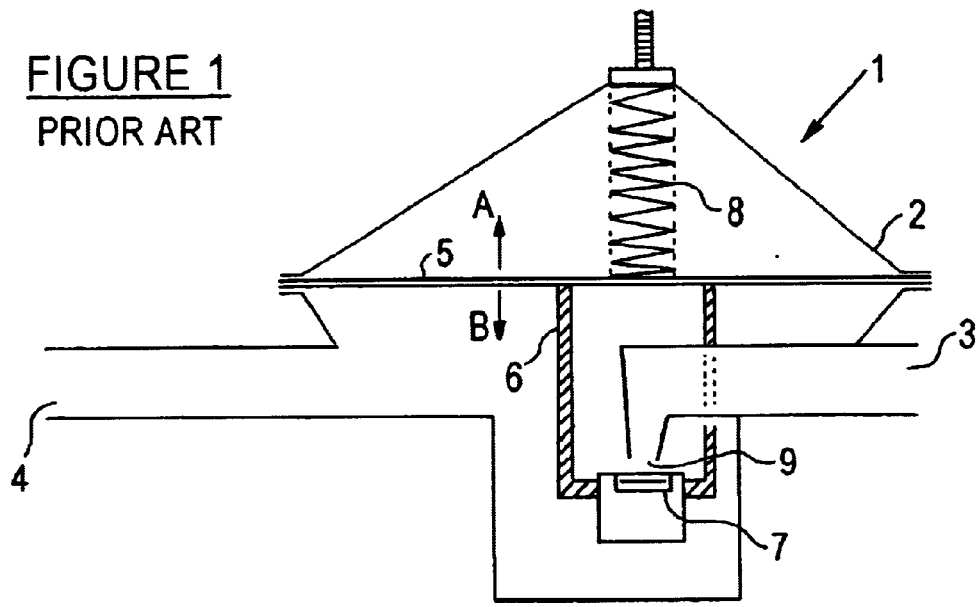
FIG. 1 is a diagrammatic cross-sectional view illustrating a typical prior art pressure reducing valve.

FIG. 1 has already been described in the Background of the Invention above and will therefore not be discussed here.

The valve assemblies depicted and described in the following drawings, for ease of reference only, all relate to a low pressure hot water system. It should, however, be appreciated that the valve assemblies may also have application to other LP and HP fluid systems.

Figure 2:
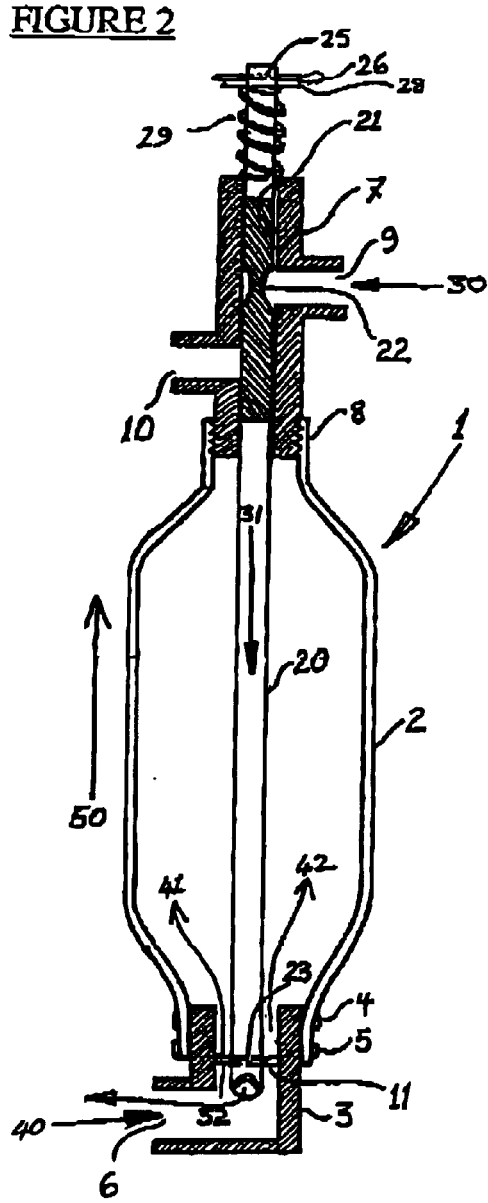
FIG. 2 is a diagrammatic cross-sectional view of an embodiment of the present invention.

With respect to FIG. 2 there is provided a valve assembly generally indicated by arrow 1. The valve assembly has an elongated balloon 2 which is connected at one end to a lower valve body 3 via means of hose clips 4 and 5. Lower valve body 3 has an outlet 6 which is connected via a conduit to a low pressure ("LP") fluid system in the form of a hot water cylinder.

The other end of balloon 2 is connected to an upper valve body 7 via a sleeve 8 to which the top end of balloon 2 is attached via a waterproof adhesive.

The internal surface of the top portion of sleeve 8 is threaded to allow it to engage with a corresponding thread on the lower portion of the outer surface of upper valve body 7.

Upper valve body 7 has an inlet 9 which may be connected via a conduit to a high pressure ("HP") mains water supply.

Upper valve body 7 also has a relief outlet 10 which may be connected to a conduit which may connect to a drain, or alternatively lead to an area suitable for draining water from valve assembly 1.

Upper valve body 7 is composed of a ceramic material. Passing through the upper valve body is a hollow valve stem 20. The top portion of valve stem 20 as indicated by the cross hatching 21 may be composed of a ceramic material. The top portion of valve stem 20 has a valve port consisting of an aperture 22.

The lower end of valve stem 20 is connected to the lower valve body 3 via a bar 11 which passes through an aperture 23 in valve stem 20.

The top end of valve stem 20 has an aperture 25 through which a split pin 26 passes to retain a washer 28 and spring 29. Spring 29 tensions upper valve body 7 in a downward direction so that fluid inlet 9 is substantially aligned with valve port 22. This allows for mains water to enter and then exit the valve assembly 1 as indicated by arrows 30, 31 and 32 so as eventually to enter the hot water cylinder.

Once the hot water cylinder of the LP fluid system has been filled pressure in the cylinder causes water, from the hot water cylinder, to enter the valve assembly as indicated by arrows 40, 41 and 42. This in turn causes the length of balloon 2 to increase in the direction of arrow 50. Increases in the length of balloon 2 cause the upper valve body 7 and hence inlet 9 to move out of alignment with valve port 22, thereby to shut off the water supply to the valve assembly, and hence the hot water cylinder.

If a tap connected to the LP fluid system is turned on this causes water to exit the hot water cylinder which in turn reduces the pressure therein. This reduction in pressure in the hot water cylinder causes balloon 2 to decrease in length bringing inlet 9 back into alignment with valve port 22. Consequently, mains water can again enter the hot water cylinder via valve assembly 1 until it is again filled. Once filled, the mains water supply to the hot water cylinder is shut off in a manner substantially as described above.

In the event that the pressure within the hot water cylinder continues to increase, this causes balloon 2 further to increase in length in the direction of arrow 50. This in turn causes further movement of upper valve body 7 and results in the relief outlet 10 coming in to alignment with valve port 22, to allow for excess water to exit the valve and hence the hot water cylinder.

Once the pressure in the hot water cylinder has returned to normal, the decrease in the length of balloon 2 along with the tension of spring 29 cause relief outlet 10 to move out of alignment with valve port 22 to prevent further water loss.

Figure 3:
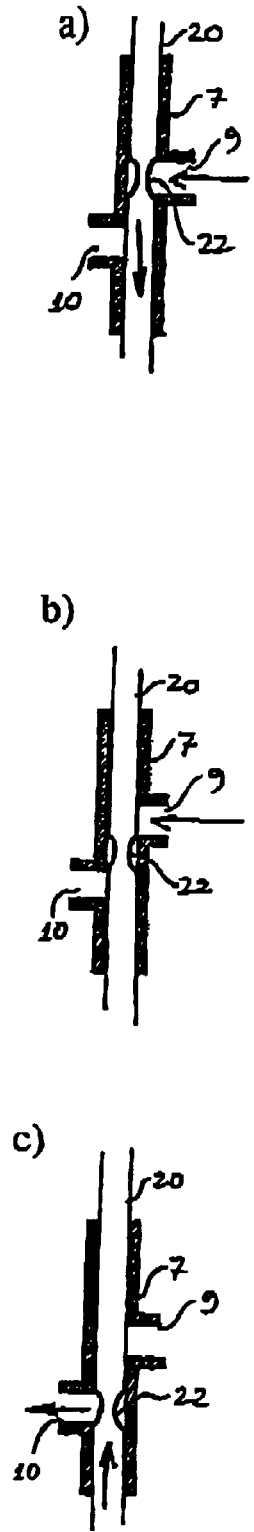
FIGS. 3(a), 3(b) and 3(c) show diagrammatically the relative positions of the valve assembly shown in FIG. 2.

The various positions the upper valve body 7 has with respect to the valve port 22 are indicated in FIGS. 3(a), 3(b) and 3(c). FIG. 3(a) shows inlet 9 aligned with valve port 22 in an "on" position. FIG. 3(b) shows inlet 9 unaligned with valve port 22 in an "off" position. FIG. 3(c) shows relief outlet 10 aligned with valve port 22 in an "over-pressure" relief position.

Figure 4:
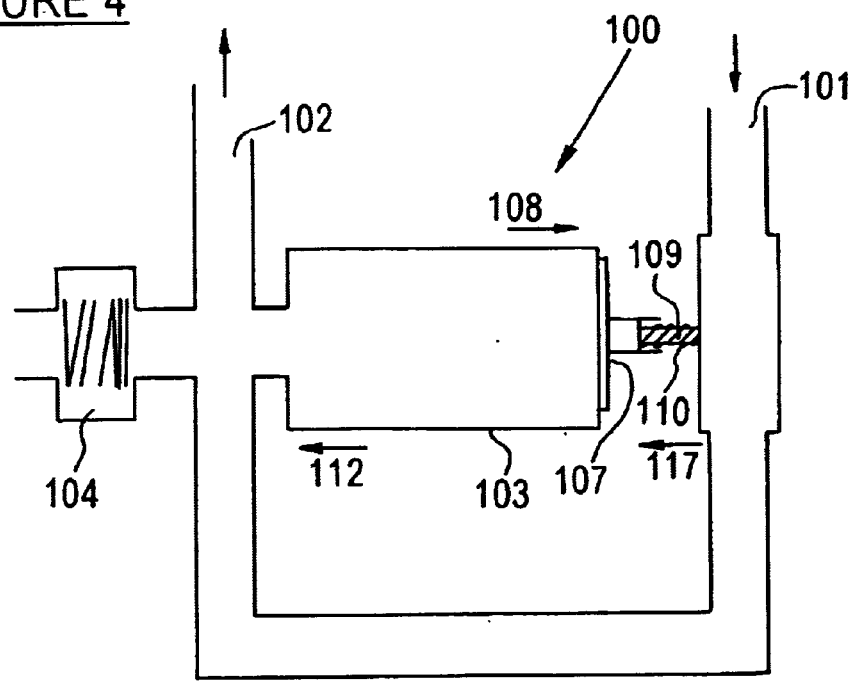
FIG. 4 is a diagrammatic cross-sectional view of an alternative embodiment of the present invention.

With respect to FIG. 4 there is shown an alternative valve assembly 100. The valve assembly 100 has an inlet 101 and an outlet 102. Inlet 101 is connected to the high pressure mains water supply and outlet 102 is connected to a low pressure ("LP") hot water cylinder.

Valve assembly 100 also has a flexible bellows 103 which is in communication with the LP hot water cylinder. Valve assembly 100 also includes an adjustable relief valve 104 which will open to exhaust water from valve assembly 100, should the pressure within the LP hot water cylinder reach a maximum pressure threshold.

In general valve assembly 100 operates in substantially a similar manner to that described for FIG. 2. Flexible bellows 103 increases or decreases in length dependent on the pressure within the LP hot water cylinder. If flexible bellows 103 increases in length, this causes its terminal end 107 to move in the direction of Arrow 108 so as to contact the terminal end of the valve head 109, in which there is a port. The valve head then moves in direction 108 which takes it out of alignment with inlet 101 to shut off the flow of mains water.

Conversely, if the flexible bellows 103 decreases in length in the direction indicated by Arrow 112, terminal end 107 of the bellows is no longer in contact with valve head 109. A return spring 110 is now able to move valve head 109 in the direction of Arrow 117 so the valve port is now aligned with the inlet 101. Consequently, water can now flow through valve assembly 100 and into the LP hot water cylinder.

Figure 5:
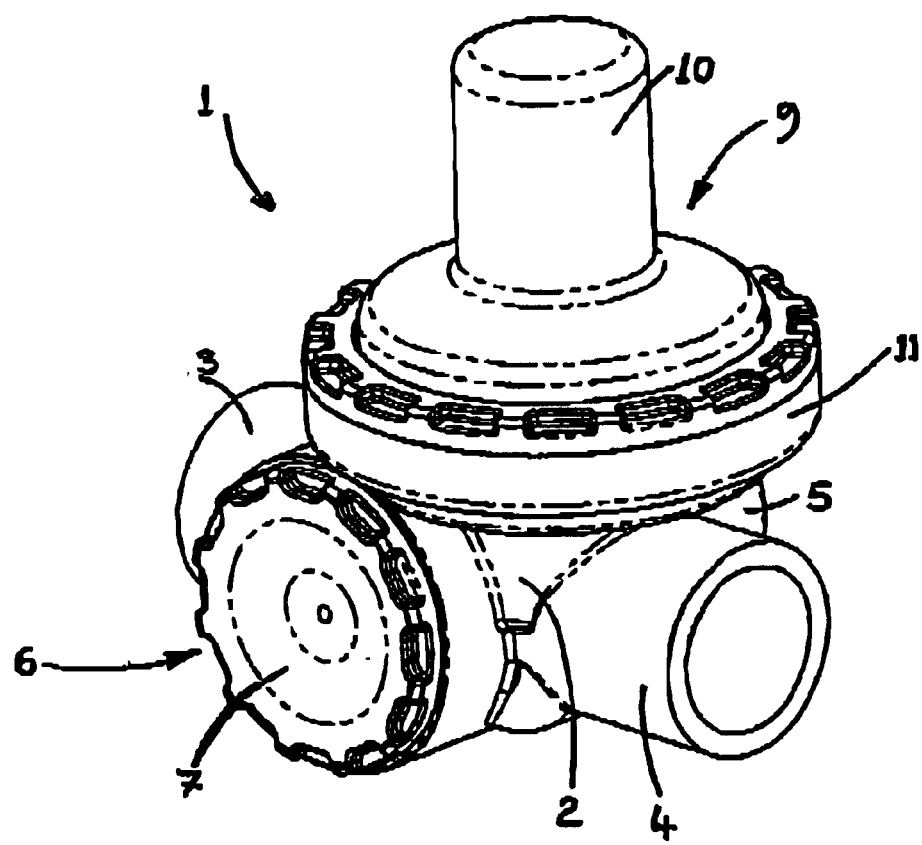
FIG. 5 is a perspective view of the valve body of a preferred embodiment of the present invention in the form of the Mod Assembly.

With respect to FIG. 5 there is provided a valve assembly generally indicated by arrow 1. Valve assembly 1 has a valve body 2 having an inlet connecting portion 3 which in most applications is connected via a conduit to a high pressure ("HP") mains water supply. Valve body 2 also has an outlet 4 which is connected via a conduit to a low pressure ("LP") fluid system in the form of a hot water cylinder.

The valve body 2 also has a relief outlet connecting portion 5. Relief outlet connecting portion 5 is connected to a conduit which may connect to a drain, or alternatively lead to an area suitable for draining water from valve assembly 1.

Valve body 2 also has an opening in the region indicated by arrow 6 which allows for access to many of the components of the valve assembly 1 housed within valve body 2. Access opening 6 is closed via a retainer cap 7. Valve body 2 also has a top opening in the region indicated by arrow 9 wherein a retainer cap also allows for access to the components housed within the valve body. Opening 9 is closed via a spring cap 10 which is connected to the valve body 2 via a clamp ring 11. In general, retainer cap 9 and clamp ring 11 are threadably connected to the valve body 2.

Figure 6:
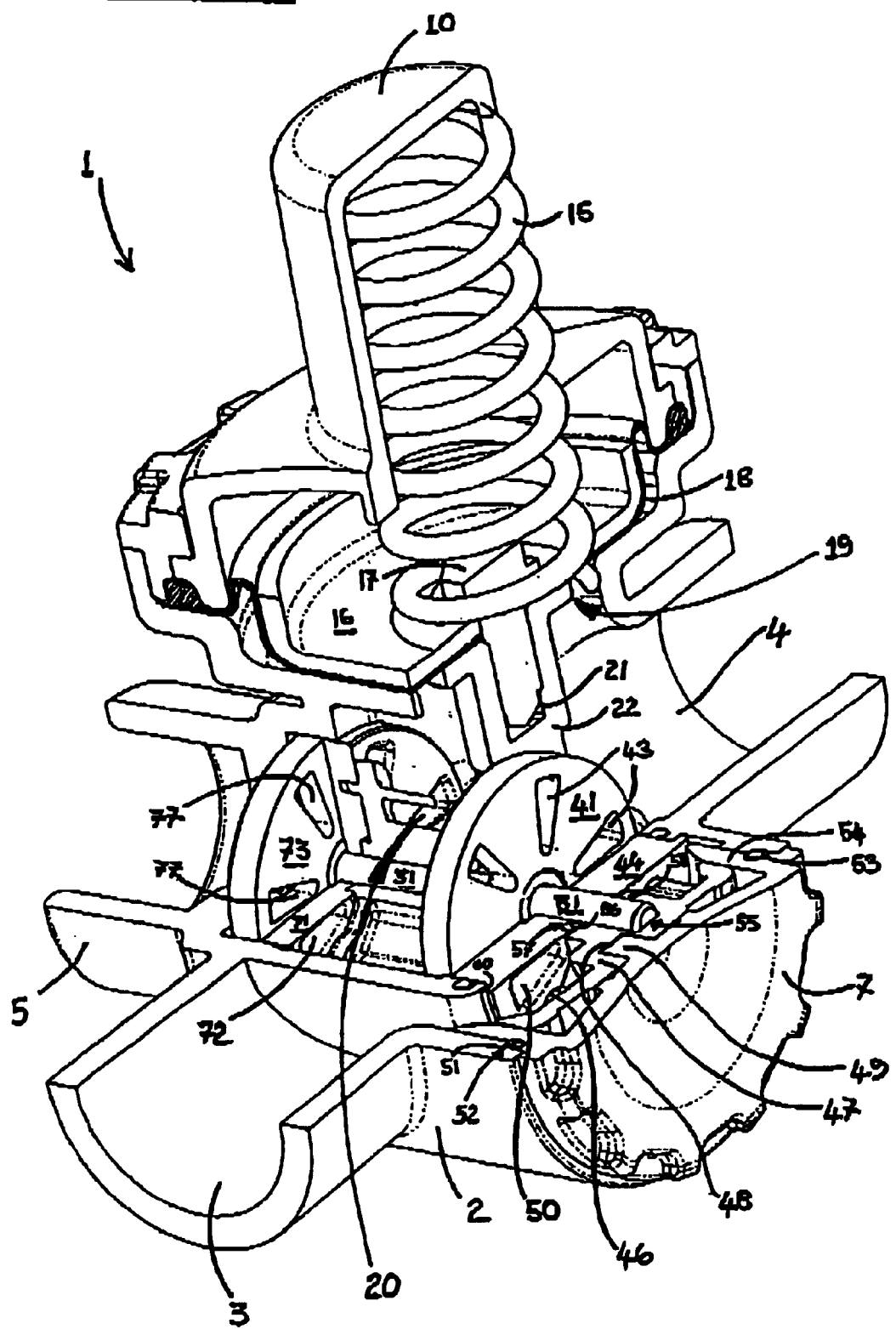
FIG. 6 is a perspective cutaway portion of the valve body shown in FIG. 5 illustrating the internal valve assembly.
Figure 7:
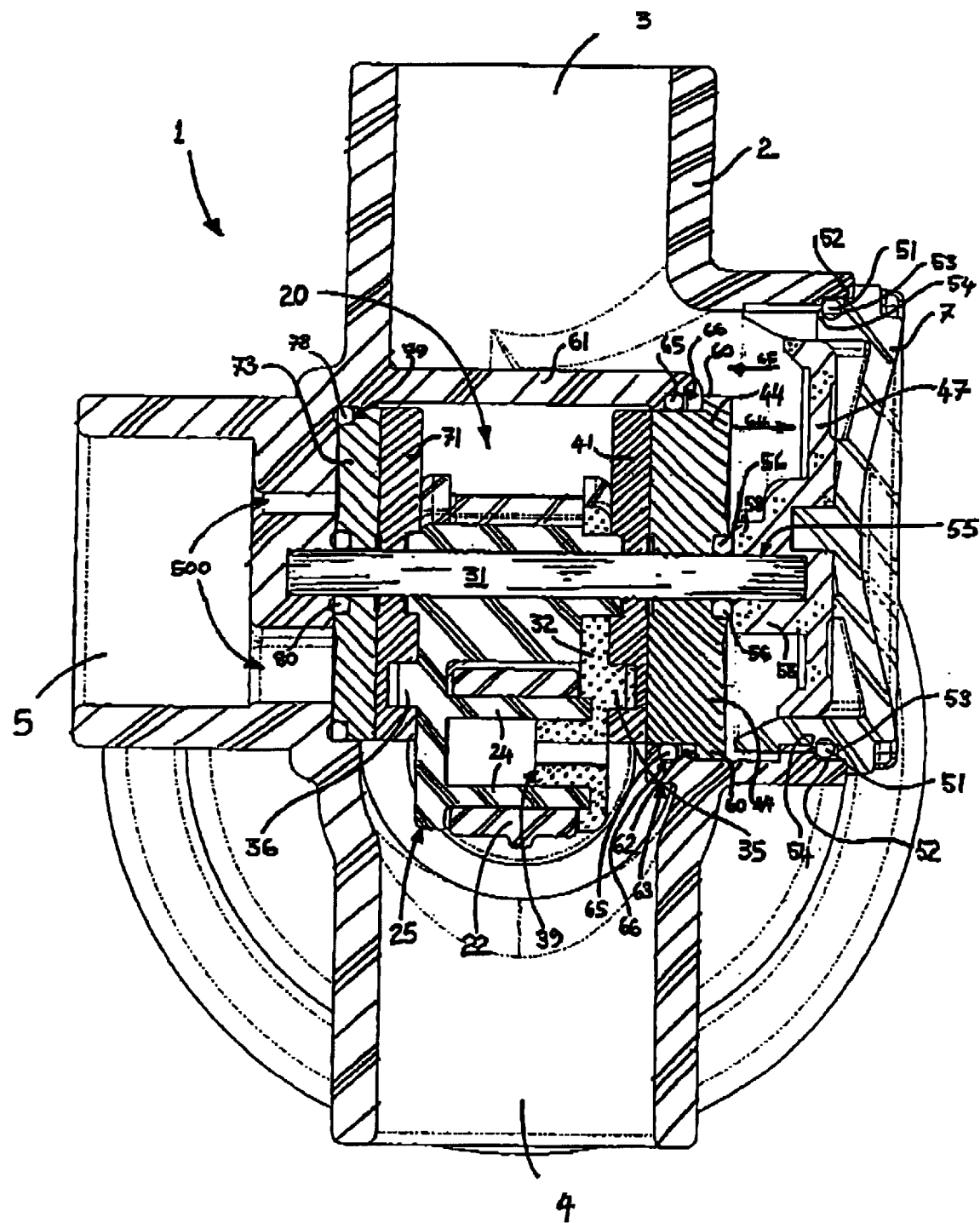
FIG. 7 is a horizontal top plan sectional view of the valve assembly shown in FIG. 6.

With respect to FIGS. 6 and 7 there is shown a preferred embodiment of valve assembly 1 which includes a spring 15 that has its upper portion located within spring cap 10. The lower end of spring 15 forces down on a piston 16. The lower end of spring 15 is located on the top of the piston 16 via the head of a trilobe screw 17. The bottom surface of piston 16 sits on a diaphragm 18 which seals the top opening 19 of the valve chamber 20 formed by valve body 2.

Trilobe screw 17 passes through apertures in piston 16 and diaphragm 18 and threadably engages a central aperture 21 in a con rod 22.

Con rod 22 has bore 23 (see FIG. 13) having a bearing surface in which a journal 24 extending from a drive base 25 is received. Drive base 24 has two drive dog lugs ("DD lugs") 26 and 27 extending in the same direction as journal 24. DD lugs 28 and 29 are located on the opposite side of the drive base 25 but have the same spatial position with respect to drive base 25 as DD lugs 26 and 27. Drive base 25 also includes an aperture 30 (see FIGS. 13 and 14) having a bearing surface for receiving an axle 31.

Drive base 25 is retained on con rod 22 via a drive lock plate 32. The drive lock plate has apertures 33 and 34 which are configured to snap lock onto DD lugs 26 and 27 so that the distal portions of DD lugs 26 and 27 can still extend through apertures 33 and 34. Drive lock plate 32 also has a lugged cap portion 39 designed to snap fit onto the distal end of journal 24 once it has been received in aperture 23 of con rod 22.

Drive lock plate 32 also has an aperture 37 (see FIG. 14) having a bearing surface for receiving axle 31. Drive lock plate also has a DD lug 35 extending from its surface in the same direction as those of DD lugs 26 and 27 of drive base 25 when located in apertures 33 and 34. Drive base 25 also has a further DD lug 36 (see FIG. 14) which extends in the same direction as DD lugs 28 and 29. DD lug 36 is in alignment with DD lug 35 when the drive base 25 and lock plate 32 are connected via journal 24, lugs 26, 27 and axle 31.

The distal end portions of DD lugs 26, 27 and 35 locate in appropriately positioned recesses 40, all situated in a valve head in the form of a ceramic "rotating" inlet port ("RIP") disc 41. The fit of the lugs 26, 27 and 35 into the recesses 40 in RIP disc 41 is such that any lateral movement of the lugs will cause a corresponding lateral movement of disc 41. The RIP disc 41 also has a centrally positioned aperture 42 including a bearing surface for receiving axle 31. Accordingly, ceramic RIP disc 41 is designed to rotate about axle 31 when DD lugs 26, 27 and 35 are caused to move by the con rod 22 and its associated piston 16. Ceramic RIP disc 41 also includes a number of inlet ports 43 which allow for the travel of water through disc 41.

A "stationary" inlet ("SI") ceramic disc 44 has a central aperture 45 with a bearing surface for receiving axle 31. The SI disc 44 is positioned on axle 31 so that it abuts RIP disc 41.

The SI disc 44 includes three recesses on the opposite face to that which abuts RIP disc 41. These recesses receive lugs 46 which extend from a stop plate 47. The fits of lugs 46 into the recesses in disc 44 are tight, such that there is no movement of SI disc 44 relative to stop plate 47. SI disc 44 includes a number of fluid inlet apertures 50. Stop plate 47 itself has a recess 48 located on the opposite surface to that adjacent SI disc 44. Recess 48 receives a lug 49 which extends from the inner surface of retaining cap 7. The fit of recess 48 about lug 49 is such as to prevent any movement of stop plate 47 relative to cap 7. Furthermore, lug 49 and recess 48 are positioned so as to not be coaxial with respect to axle 31 to prevent any rotation of stop plate 47 relative to valve body 2.

The stop plate 47 is configured so that the majority of its surface area does not abut the outer surface of SI disc 44. The purpose of this gap is to allow for HP mains water to have access to inlets 50 in SI disc 44.

A fluid tight seal is effected between valve body 2 and the retainer cap 7 via O-ring 51 which locates in an annular groove 52 on the inside edge of opening access 6 of valve body 2. O-ring 51 also abuts against shoulder and ridge portions 53 and 54 of retainer cap 7. Stop plate 47 also includes an aperture 55 having a bearing surface of which receives one end of axle 31. To effect a seal between SI disc 44, stop plate 47 and the axle 31, an O-ring 56 is located in an annular groove 57 in SI disc 44 so it can abut axle 31. The outer surface of O-ring 56 is abutted by the raised ends 58 of aperture 55.

SI disc 44 has a radial flange 60 which effectively increases the surface area of the "non-sealing" face of the SI disc 44 which is opposite that which abuts the RIP disc 41. The radial flange 60 effectively forms a shoulder which can abut against an internal chamber wall 61 of valve body 2 and a shoulder 62 on valve body 2.

The pressure of the HP mains water supply can vary. To compensate for this the ends of lugs 46 and raised ends 58 of stop plate 47 (i.e. the portions of stop plate 47 closest to SI disc 44) do not contact the SI disc 44 unless little or no pressure is being applied on SI disc 44 by the incoming HP water. This clearance is achieved as the length of axle 31 holds stop plate 47 away from SI disc 44. Although, as a result of this clearance SI disc 44 can move back in the direction of arrow 64 until it hits the ends of lugs 46 and raised ends 58 of plate 47, the purpose of this clearance is so that at times when the mains water pressure is below its maximum, the frictional force between the sealing faces of the RIP and SI discs 41 and 44 is minimized to only that necessary to effect a watertight seal.

When higher pressures are experienced in the mains water supply, and hence on the SI disc 44, the maximum frictional force encountered between the sealing faces of the RIP and SI discs 41 and 44 can be limited by radial flange 60 abutting wall 61 and shoulder 62. Flange 60 thereby prevents any further movement of SI disc 44 in a forward direction as indicated by arrow 65 said movement being caused by the inward force exerted on SI disc 44 by the pressure of the incoming HP water.

To prevent any water leaking into the chamber around the outside edge of SI disc 44, an O-ring 65 is located in a groove 66 in internal chamber wall 61 and shoulder 63 of valve body 2.

Figure 13:
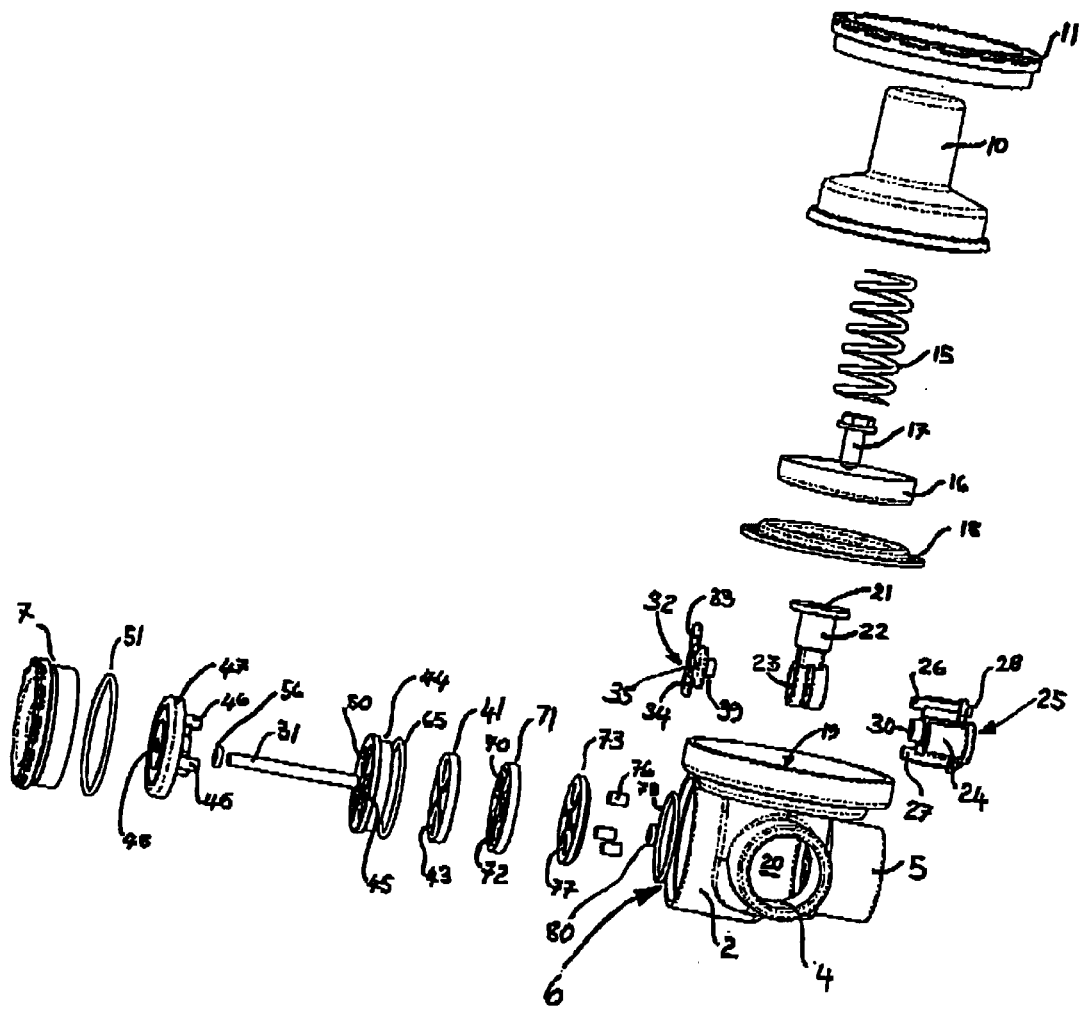
FIG. 13 is an exploded diagram illustrating the various components of the valve assembly described in relation to FIGS. 5–12.

The distal portions of DD lugs 28, 29 and 36 locate in appropriately located recesses 70 situated in a rotating relief port ("RRP") disc 71 (see FIG. 13). The fit of the DD lugs 28, 29 and 36 into recesses 70 in RRP disc 71 is such that any lateral movement of the lugs will cause a corresponding lateral movement of disc 71. RRP disc 71 also has a centrally positioned aperture 82 including a bearing surface for receiving axle 31. Accordingly, the ceramic RRP disc 71 is designed to rotate about axle 31 when DD lugs 28, 29 and 36 are caused to move by con rod 22 and its associated piston 16. RRP disc 71 which has the same configuration as RRP disc 41 also includes a number of relief ports 72 which allow for the escape of water through disc 71.

A stationary relief ("SR") ceramic disc 73 has a central aperture 74 with a bearing surface for receiving axle 31. SR disc 73 is positioned on axle 31 so that it abuts RRP disc 71.

The SR disc 73 includes three recesses 75 on the opposite face to that which abuts RRP disc 71. Recesses 75 receive stop pins 76 which extend from recesses in valve body 2. The fit of stop pins 76 into the recesses in valve body 2 is tight such that there is no room for lateral movement between the pins and valve body 2. The fit of stop pins 76 into recesses 75 in SR disc 73 is also tight, such that there is no movement of SR disc 73 relative to stop pins 76. SR disc 73 has a number of relief outlet apertures 77. Relief outlets 77 are positioned adjacent outlets 500 in valve body 2 so that any water flowing through outlets 77 can exit valve assembly 1 via outlet connecting portion 5.

SR disc 73 has, with the exception of annular groove 79, substantially the same configuration as that of RRP disc 71 and RIP disc 41.

A fluid tight seal is effected between valve body 2 and SR disc 73 via an O-ring 78 which is received in an annular groove 79 in disc 73. A seal between SR disc 73 and axle 31 is effected via an O-ring 80 which is received in an annular groove in SR disc 73 so it can abut axle 31.

It should be appreciated by those skilled in the art that O-rings 78 and 80 should be selected so that they have sufficient strength to withstand any over-pressure from the mains water supply not taken by the radial flange 60. If O-rings 78 and 80 fail, then RIP disc 41 can move away from SI disc 44 so there is no fluid-tight seal between the sealing faces of those discs, and the valve will be compromised.

Recesses 75 in the valve body 2 in which stop pins 76 are received, are positioned so that stop pins 76 position SR disc 73 so that its relief outlets 77, have a different spatial orientation with respect to valve body 2 to that of fluid inlet apertures 50 of SI disc 44. This is to ensure that when inlet ports 43 of RIP disc 41 are aligned with fluid apertures 50 in SI disc 44, relief ports 72 of RRP disc are not aligned with relief outlets 77 of SR disc 73; and vice versa.

Figure 8:
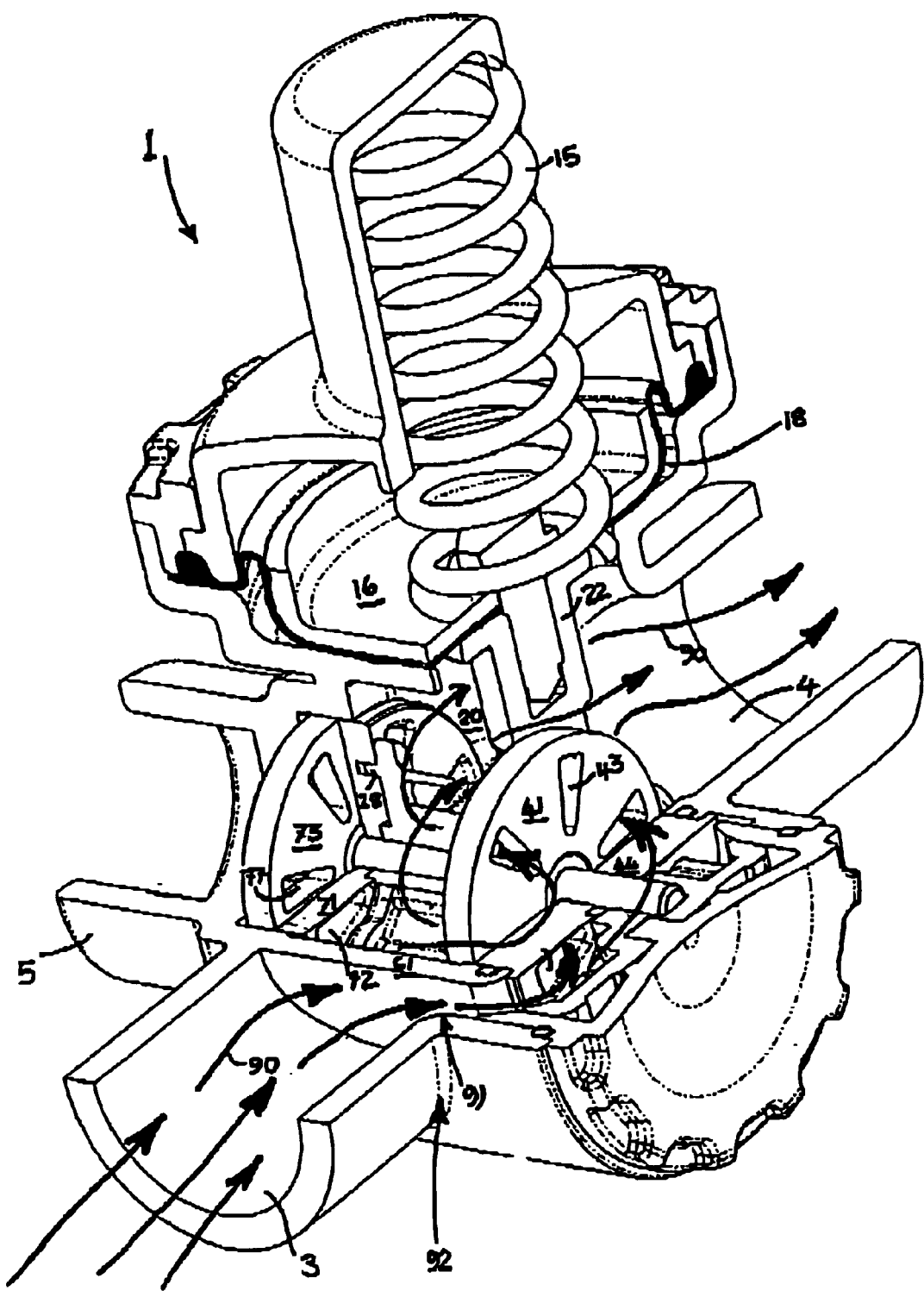
FIGS. 8–11 all show a cutaway perspective view of the valve assembly shown in FIGS. 5–7 illustrating the different operating positions of the valve assembly.

With respect to FIG. 8 the valve assembly 1 in its "fully open" position is shown.

For ease of reference only, SI and RIP discs 44 and 41 will now be collectively referred to as the "inlet discs", and SR and RRP discs 73 and 71 will now be collectively referred to as the "vent discs".

When valve assembly 1 is in its open position as is shown in FIG. 8, spring 15 is in a relaxed position (i.e. having minimal potential energy) whereby spring 15 biases piston 16 and diaphragm 18 to the their lowermost positions as shown. When piston 16 and diaphragm 18 are in such lower most positions, con rod 22 via the DD lugs 26, 27 and 35 have positioned RIP disc 41 so that its inlet ports 43 are aligned with the fluid inlet apertures 50 in SI disc 44 (which is shown partially cut away so as to reveal RRP disc 41 in more detail). Accordingly, inlet discs 41 and 44 are in the "open position". Conversely, the con rod via DD lugs 28, 29 and 36 have orientated RRP discs 71 so that relief ports 72 are not aligned with the relief outlets 77 of SR discs 73 (i.e. the vent discs are in the "closed position").

When the inlet discs are in their "open position", water 90 is able to enter valve assembly 1 from the HP mains supply via a conduit connected to inlet connecting portion 3 of valve body 2. The HP water then passes through a neck 91 formed between internal chamber wall 61 and the outside wall in the region indicated by arrow 92. The incoming HP water 90 then passes through inlet apertures 50 in SR disc 44. As the HP discs are aligned water 90 is able to pass through inlet ports 43 of RIP disc 41 and into an internal valve chamber 20. As the vent discs 71 and 73 are in the "closed position" (i.e. non-aligned) the HP water 90 travels through the internal chamber 20 and out via outlet 4 via a conduit to enter an LP hot water cylinder.

When the diaphragm is in its "fully open" position the calculated spring load is substantially 123.9N on piston 16 and this requires a pressure of approximately 67.7 KPA (10PSI) in internal chamber 20 and hence the hot water cylinder before it moves upwardly.

Once the hot water cylinder of the LP fluid system has been filled with water, the increased pressure in the cylinder causes water from within the cylinder to enter valve chamber 20. This causes the diaphragm 18 and associated piston 16 to move in an upwardly direction against the biasing force of spring 15 to the "set pressure" position shown in FIG. 9.

Figure 9:
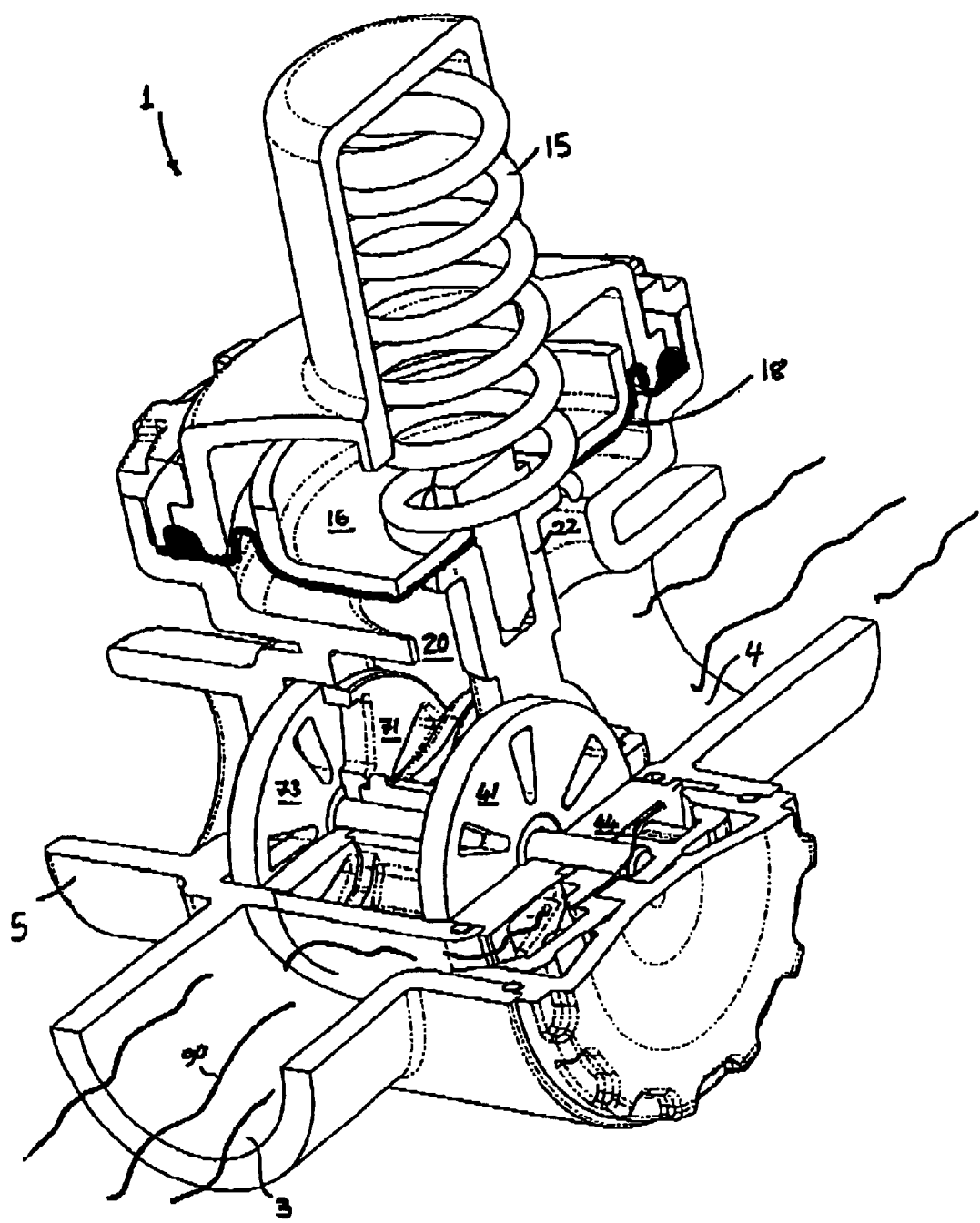

When the diaphragm is in its "set pressure" position as shown in FIG. 9 both the inlet discs and vent discs are in their "closed positions" (i.e. not aligned). Accordingly, there is no water movement in or out of valve assembly 1.

In the "set pressure" system the calculated spring load on piston 16 is substantially 137.3 N and this requires a pressure of approximately 75 KPA (11 PSI) in internal chamber 20 and the hot water cylinder.

Figure 10:
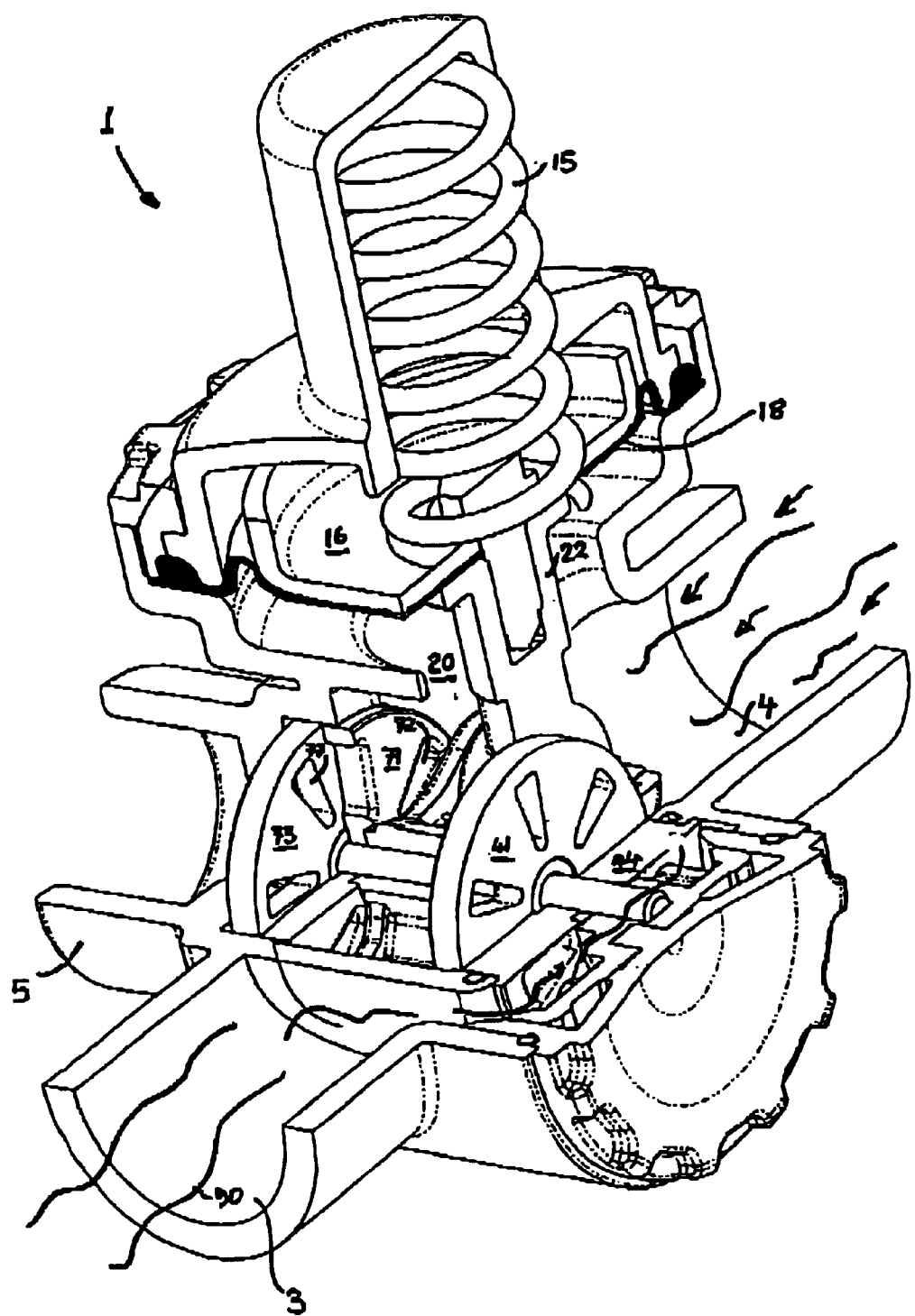

With respect to FIG. 10, diaphragm 18 and associated piston 16 have moved even higher within valve assembly 1 to a "initial vent" position. In the "initial pressure" position, con rod 22 and associated DD lugs 28, 29 and 36 have oriented RRP disc 71 so that its relief ports 72 are very slightly aligned with the relief outlets 77 in SR disc 73.

Conversely, con rod 22 when in the "initial-vent" position has the RIP disc 41 oriented so that the inlet discs are in their "closed position" (i.e. non-aligned).

In the "initial pressure" position the calculated spring load on piston 16 is substantially 142.3N and this require a pressure of approximately 77.7 KPA (11.42 PSI) in internal chamber 20 and the hot water cylinder.

Figure 11:
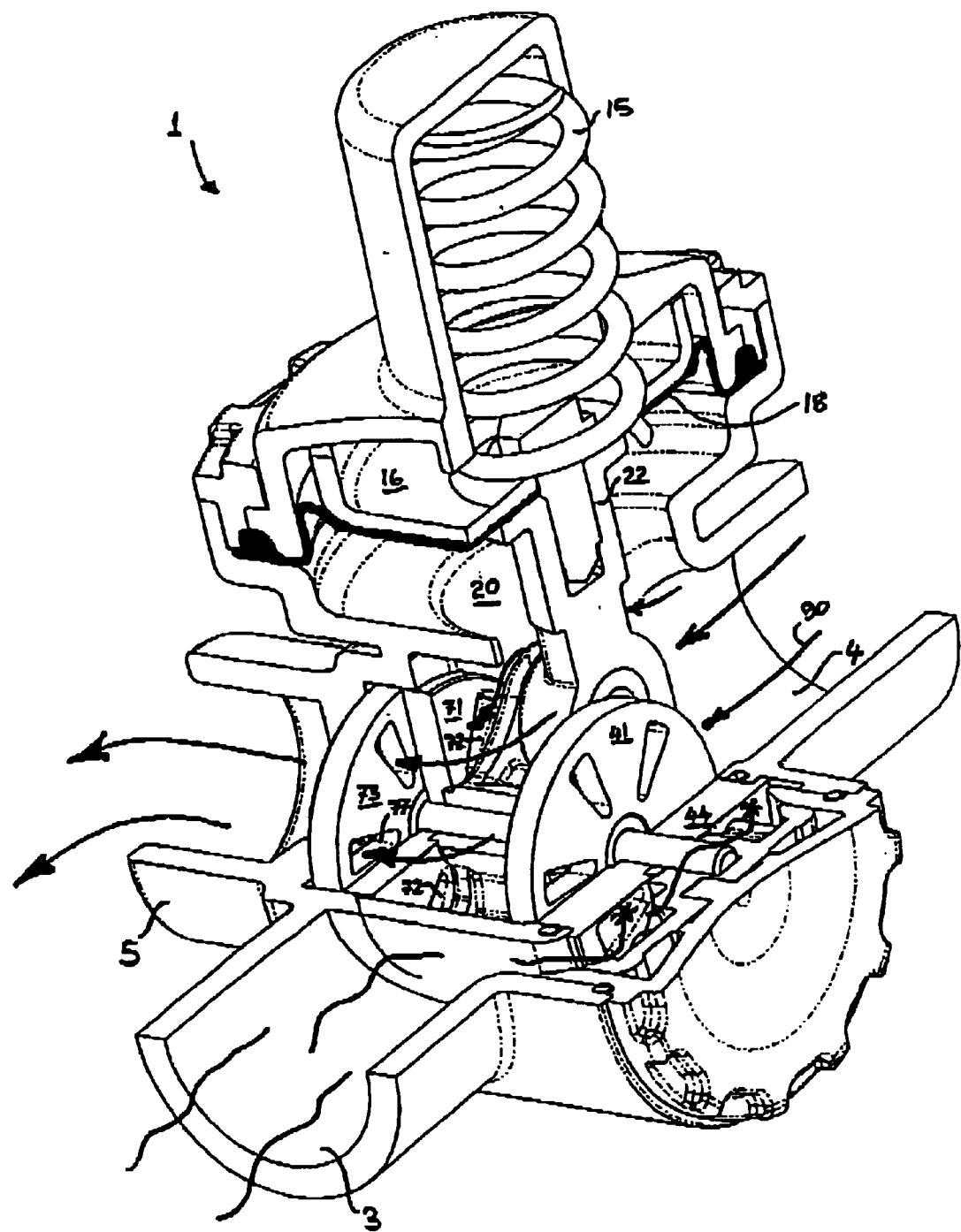

With respect to FIG. 11 the valve assembly is shown with the diaphragm 18 and associated piston 16 in their uppermost "fully vented" position.

In this position, con rod 22 and its associated lugs 28, 29 and 36 have oriented RRP disc 71 so that its relief ports 72 are fully aligned with the relief outlets 77 of SR disc 73 (i.e. the vent discs are in the "open position"). When con rod 22 is in this position within valve assembly 1, the orientation of RIP disc 41 is such that the inlet discs still remain in a "closed position" (i.e. non-aligned).

Accordingly, water 90 flows from the hot water cylinder of the LP fluid system and out through relief ports 72 and relief outlets 77 in the vent discs and out of valve assembly 1 via relief outlet connecting portion 5.

When the valve assembly is in the "fully vented" position the calculated spring load is substantially 155.7N and this requires a pressure of substantially 85 KPA (12.5 PSI) in internal chamber 20 and hence the hot water cylinder.

Valve assembly 1 will remain in the "fully vented" position shown in FIG. 11 until the pressure of the LP fluid system drops to below substantially 75 KPA (11 PSI).

It will be appreciated by those skilled in the art, that the effect of operating any taps connected to the LP fluid system will cause valve assembly 1 to function in a substantially similar manner to that already described with respect to FIG. 2.

Figure 12:
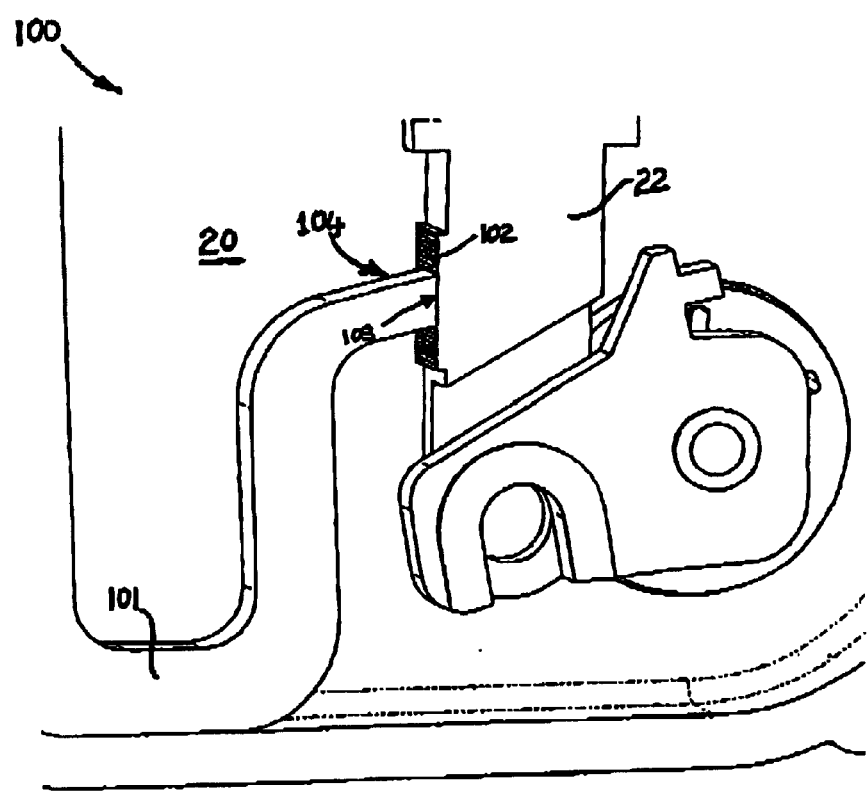
FIG. 12 is a diagrammatic partial view of the internal valve assembly illustrating a ratchet arm associated with an embodiment substantially similar to that shown in FIG. 6.

With respect to FIG. 12 there is shown a cutaway view of a valve assembly 100 substantially the same as that shown in FIGS. 5–11. Valve assembly 100 differs, however, in that it also has a ratchet arm 101 associated with con rod 22. Ratchet arm 101 is composed of a resilient material and constructed such that it exerts a force on a pawl portion 104 of ratchet arm 101. Pawl portion 104, has teeth 103 adapted to engage the teeth 102 on con rod 22, to control movement of con rod 22 in an upward direction.

Ratchet arm 100 and its associated pawl teeth 103 are biased onto teeth 102 of con rod 22 so that teeth 102 and 103 remain engaged until a force greater than the biasing force of ratchet arm has been applied to con rod 22 via piston 16.

The force required to disengage teeth 102 and 103 will generally be the force exerted by piston 16 and diaphragm 18 (both not shown in FIG. 12) when the pressure in internal chamber 20 is slightly less than the recommended maximum pressure of the LP fluid system. For example, if the recommended maximum pressure of the LP hot water cylinder is 11 PSI a pressure of greater than 10 PSI within the internal chamber 20 should result in the piston 16 exerting a sufficient force onto con rod 22 to disengage teeth 102 and 103.

The purpose of ratchet arm 100 is to help prevent any normal "back flow" pressure from the LP fluid system causing the valve assembly to shut off the HP inlet flow via the inlet discs, when the hot water cylinder is still empty.

In addition, a further effect of ratchet arm 101 is to cause the inlet discs to substantially only exist in either the "fully open" or "fully closed" position. Consequently, water exiting the LP fluid system via a tap will always remain at substantially full pressure, as the inlet ports are always in their "fully open" position when there is a reduced pressure in the hot water cylinder (i.e. the amount of mains water entering the system will not be reduced by partially aligned ports and inlets).

Figure 14:
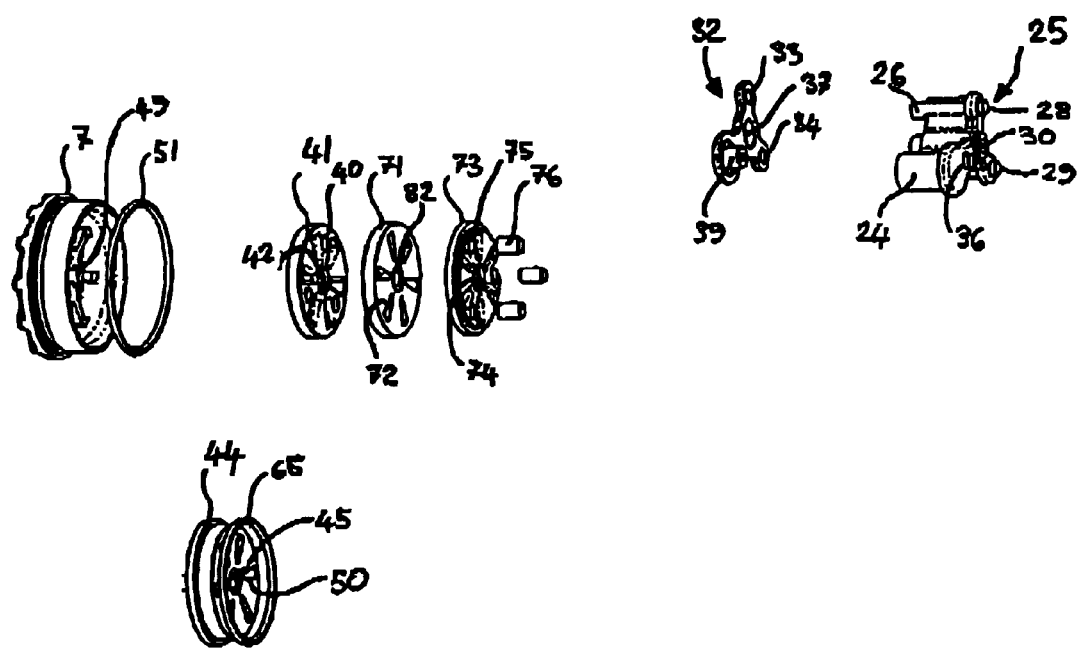
FIG. 14 illustrates certain components shown in FIG. 13 as seen from a different perspective than that shown in FIG. 13.

FIG. 13 illustrates an exploded view of the components of the valve assembly described in relation to FIGS. 6–11. FIG. 14 illustrates for clarity from a different perspective some of the components shown in FIG. 13.

In situations where the mains water supply to the hot water cylinder is turned off and where the power to the hot water cylinder is also turned off (such as may occur at a holiday home): due to thermal contraction a negative pressure in the cylinder may result. To equalize this negative pressure air or water must enter the cylinder to avoid an implosion from occurring. In this situation it is envisaged air or water may enter the LP cylinder via:

a) Utilizing a mains supply control valve engineered to be leaky so that it can allow water to enter the LP fluid system; or b) Positioning a pressure sensitive valve (e.g. a poppet valve) so that it is located upstream of the valve assembly of the present invention, but downstream of the mains supply control valve—so that it can allow air to enter the LP fluid system; or c) Utilizing a relief valve in accordance with the present invention, on the outlet of the hot water cylinder such as described for FIG. 13 above.

As an alternative to the ratchet arm arrangement shown in FIG. 12, spring 15 may be engineered so that its calculated spring load in its relaxed position is slightly less than the recommended maximum pressure of the hot water cylinder—(which is the pressure at which the valve moves to its set pressure position shown in FIG. 13). Accordingly, the piston and con rod 22 will not move until this pressure has been released.

In general, it is envisaged this may be achieved by selecting a relatively long spring so that there is only a small degree of variation between the potential energy of the spring between its "fully open" and "set pressure" positions within the valve assembly of the present invention.

Aspects of the present invention have been described by way of example only and it should be appreciated that modifications and additions may be made thereto without departing from the scope of the following claims:

What is claimed is:

1. A valve assembly wherein the valve assembly includes: a valve port; a first opening; a second opening; a third opening; and a pressure sensitive member; the position of said pressure sensitive member capable of being altered solely in response to pressure changes within a fluid system to which said first opening is connected wherein said changes in the position of said pressure sensitive member cause said valve port to move either into or out of alignment with said second or said third opening so that said valve port is movable to each of the following positions: (1) at least partially aligned with said second opening but not said third opening, or (2) at least partially aligned with said third opening but not with said second opening, or (3) not aligned with either said second or said third openings; the valve assembly including a relief outlet; and being configured so that the position of said pressure sensitive member will alter to an extent that enables said pressure sensitive member to move said relief outlet and said valve port into alignment with one another when a predetermined pressure limit is reached in said fluid system.

2. A valve assembly in accordance with claim 1, wherein said relief outlet is located in a ceramic disc.

3. A valve assembly wherein the valve assembly includes: at least one valve port; a first opening; a second opening; a third opening; and a pressure sensitive member; the position of the pressure sensitive member being capable of being altered solely in response to pressure changes within a fluid system to which said first opening is connected, wherein said changes in the position of said pressure sensitive member cause said valve port to move either into our out of alignment with a second or third opening, such that said valve port is movable to each of the following positions: (1) at least partially aligned with said second opening but not said third opening; or (2) at least partially aligned with said third opening but not said second opening; or (3) not aligned with either said second or third openings; said alteration of the position of said pressure sensitive member upon an increase or decrease in pressure alters the surface area of said pressure sensitive member.

4. A valve assembly in accordance with claim 3, wherein changes in the surface area of said pressure sensitive member cause the rotation of a valve head which is in the form of a disc, said disc including said valve port such that said valve port moves either into or out of alignment with said fluid inlet.

5. A valve assembly wherein the valve assembly includes: a valve port; a first opening; a second opening; a third opening; a pressure sensitive member, the position of said pressure sensitive member capable of being altered solely in response to pressure changes within a fluid system to which said first opening is connected, wherein said changes in position of said pressure sensitive member cause the valve port to move either into or out of alignment with said second or third openings, such that said valve port is movable to each of the following positions: (1) at least partially aligned with said second opening but not said third opening; or (2) at least partially aligned with said third opening but not said second opening; or (3) not aligned with either said second or said third openings; said valve port being located on a valve head, the valve assembly further comprising a sealing face of said valve head which is composed of a ceramic material.

6. A valve assembly in accordance with claim 5, wherein an outer face of an inlet into said valve assembly is composed of a ceramic material.

7. A valve assembly in accordance with claim 5, wherein said valve head comprises a ceramic disc.

8. A valve assembly in accordance with claim 7, which comprises an inlet located in a ceramic disc.

9. A valve assembly wherein the valve assembly includes: a valve port; a first opening; a second opening; a third opening; a pressure sensitive member; the position of said pressure sensitive member capable of being altered solely in response to pressure changes within a fluid system wherein the size of said pressure sensitive member decreases when the pressure in said fluid system decreases and conversely increases when the pressure within said fluid system increases; said fluid system having a first opening which is so connected in the valve assembly wherein said changes in position of said pressure sensitive member cause said valve port to move either into or out of alignment with said second or said third openings, such that said valve port is movable to each of the following positions: (1) at least partially aligned with said second opening but not said third opening; (2) at least partially aligned with said third opening but not said second opening; or (3) not aligned with either said second or said third openings.

10. A valve assembly wherein the valve assembly includes: a valve port; a first opening; a second opening; a third opening; and a pressure sensitive member, the position of said pressure sensitive member capable of being altered solely in response to pressure changes within a fluid system wherein the valve assembly is disposed between a fluid at a lower pressure and a fluid at a higher pressure; said first opening being connected in said fluid system wherein changes in the position of said pressure sensitive member cause the valve port to move either into or out of alignment with said second and said third openings, such that said valve port is movable to each of the following positions: (1) at least partially aligned with said second opening but not said third opening; or (2)

at least partially aligned with said third opening but not with said second opening; or (3) not aligned with either said second or said third openings; the arrangement being that the initial pressure change causing movement of said pressure sensitive member is in response to said lower pressure fluid;

said valve assembly further comprising a valve chamber to which an outlet is connected in which valve chamber said pressure sensitive member is located.

11. A valve assembly wherein the valve assembly includes: a valve port; a first opening; a second opening; a third opening; and a pressure sensitive member, the position of said pressure sensitive member capable of being altered solely in response to pressure changes within a fluid system wherein the valve assembly is disposed between a fluid at a lower pressure and a fluid at a higher pressure; said first opening being connected in said fluid system wherein changes in the position of said pressure sensitive member cause the valve port to move either into or out of alignment with said second and said third openings, such that said valve port is movable to each of the following positions: (1) at least partially aligned with said second opening but not said third opening; or (2) at least partially aligned with said third opening but not with said second opening; or (3) not aligned with either said second or said third openings; the arrangement being that the initial pressure change causing movement of said pressure sensitive member is in response to said lower pressure fluid;

wherein said valve assembly further comprises a valve head having a sealing face, said sealing face being composed of a ceramic material, a portion of said valve body substantially corresponding to the configuration and dimensions of the perimeter of said valve head to effect a fluid tight seal.

12. A valve assembly wherein the valve assembly includes: a valve port; a first opening; a second opening; a third opening; and a pressure sensitive member, the position of said pressure sensitive member capable of being altered solely in response to pressure changes within a fluid system wherein the valve assembly is disposed between a fluid at a lower pressure and a fluid at a higher pressure; said first opening being connected in said fluid system wherein changes in the position of said pressure sensitive member cause the valve port to move either into or out of alignment with said second and said third openings, such that said valve port is movable to each of the following positions: (1) at least partially aligned with said second opening but not said third opening; or (2) at least partially aligned with said third opening but not with said second opening; or (3) not aligned with either said second or said third openings; the arrangement being that the initial pressure change causing movement of said pressure sensitive member is in response to said lower pressure fluid;

wherein changes in the effective length of said pressure sensitive member cause fluid moving in the valve assembly to move either into or out of alignment with said valve port.

13. A valve assembly for regulating the pressure of water in a hot water tank which comprises a valve port, a first opening, a second opening, a third opening, a flexible pressure sensitive member, the configuration of said pressure sensitive member capable of being changed solely in response to pressure changes within a water system which includes a lower pressure water entering said water system and a higher pressure water in said hot water tank wherein changes in the configuration of said pressure sensitive member causes said valve port to move either into or out of alignment with said second or said third openings such that said valve port is movable to each of the following positions: (1) at least partially aligned with said second opening but not said third opening; or (2) at least partially aligned with said third opening but not said second opening; or (3) not aligned with either said second or said third openings, the arrangement being such that pressure changes causing changes in the configuration of said pressure sensitive member are in response to changes in said lower pressure water.

14. The method carried out by the valve assembly defined in claim 13.

* * * * *